United States Patent
Melvin et al.

(10) Patent No.: US 12,430,921 B2
(45) Date of Patent: Sep. 30, 2025

(54) OPTIMIZING MULTI-CAMERA MULTI-ENTITY ARTIFICIAL INTELLIGENCE TRACKING SYSTEMS

(71) Applicant: NEC Laboratories America, Inc., Princeton, NJ (US)

(72) Inventors: Iain Melvin, Princeton, NJ (US); Alexandru Niculescu-Mizil, Plainsboro, NJ (US); Deep Patel, Franklin Park, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/654,620

(22) Filed: May 3, 2024

(65) Prior Publication Data
US 2024/0378892 A1    Nov. 14, 2024

Related U.S. Application Data (60) Provisional application No. 63/500,672, filed on May 8, 2023.

(51) Int. Cl.
*G06V 20/52* (2022.01)
*G06T 7/292* (2017.01)

(52) U.S. Cl.
CPC .............. *G06V 20/52* (2022.01); *G06T 7/292* (2017.01); *G06V 2201/07* (2022.01)

(58) Field of Classification Search
CPC ..... G06V 20/52; G06V 2201/07; G06T 7/292

USPC ......................................................... 348/143
See application file for complete search history.

(56) References Cited

U.S. PATENT DOCUMENTS

| | | |
|---|---|---|
| 2022/0138969 A1 | 5/2022 | Forsgren et al. |
| 2022/0181020 A1 | 6/2022 | Keshavjee et al. |

FOREIGN PATENT DOCUMENTS

| | | |
|---|---|---|
| KR | 1020180077865 A | 7/2018 |

*Primary Examiner* — Nguyen T Truong
(74) *Attorney, Agent, or Firm* — Joseph Kolodka (57) ABSTRACT

Systems and methods for optimizing multi-camera multi-entity artificial intelligence tracking systems. Visual and location information of entities from video feeds received from multiple cameras can be obtained by employing an entity detection model and re-identification model. Likelihood scores that entity detections belong to an entity track can be predicted from the visual and location information. The entity detections predicted into entity tracks can be processed by employing combinatorial optimization of the likelihood scores by identifying assumptions from the likelihood scores, entity detections, and the entity tracks, filtering the assumptions with unsatisfiable problems to obtain a filtered assumptions set, and optimizing an answer set by utilizing the filtered assumptions set and the likelihood scores to maximize an overall score and obtain optimized entity tracks. Multiple entities can be monitored by utilizing the optimized entity tracks.

20 Claims, 7 Drawing Sheets

Receiving video feeds from multiple cameras - 110

Obtaining entity detections with visual and location information of entities from the video feeds - 120

Predicting likelihood scores that pairs of entity detections from the visual information and the location information contain the same entity - 130

Processing the pairs of entity detections predicted into entity tracks by employing combinatorial optimization of the likelihood scores to obtain optimized entity tracks 140

Monitoring multiple entities by employing the optimized entity tracks - 190

OPTIMIZING MULTI-CAMERA MULTI-ENTITY ARTIFICIAL INTELLIGENCE TRACKING SYSTEMS

RELATED APPLICATION INFORMATION

This application claims priority to U.S. Provisional App. No. 63/500,672, filed on May 8, 2023, incorporated herein by reference in its entirety.

BACKGROUND

Technical Field

The present invention relates to entity detection model analysis and more particularly for optimizing multi-camera multi-entity artificial intelligence tracking systems.

Description of the Related Art

Maximizing efficiency has been a recurring problem in computer science, especially for artificial intelligence systems. Combinatorial optimization can be used to find the most efficient way to complete computing tasks. However, using combinatorial optimization can be limited by computational resources and time constraints.

SUMMARY

According to an embodiment of the present invention, a method is provided for optimizing multi-camera multi-entity artificial intelligence tracking systems including obtaining visual and location information of entities from the video feeds received from multiple cameras by employing an entity detection model and a re-identification model, predicting likelihood scores that entity detections from the visual information and the location information belong to an entity track by employing a multi-layer perceptron, processing, by a processor device, the entity detections predicted into entity tracks by employing combinatorial optimization of the likelihood scores by identifying assumptions from the likelihood scores, the entity detections, and the entity tracks, filtering conflicting assumptions that could not be satisfied by any possible solution to obtain a filtered assumptions set, optimizing an answer set by utilizing the filtered assumptions set and the likelihood scores to maximize an overall score and obtain optimized entity tracks, and monitoring multiple entities within a location by utilizing the optimized entity tracks.

According to another embodiment of the present invention, a system is provided for optimizing multi-camera multi-entity artificial intelligence tracking systems including a memory and one or more processor devices in communication with the memory configured to obtain visual and location information of entities from the video feeds received from multiple cameras by employing an entity detection model and a re-identification model, predict likelihood scores that entity detections from the visual information and the location information belong to an entity track by employing a multi-layer perceptron, process, by a processor device, the entity detections predicted into entity tracks by employing combinatorial optimization of the likelihood scores to identify assumptions from the likelihood scores, the entity detections, and the entity tracks, filter conflicting assumptions that could not be satisfied by any possible solution to obtain a filtered assumptions set, optimize an answer set by utilizing the filtered assumptions set and the likelihood scores to maximize an overall score and obtain optimized entity tracks, and monitor multiple entities within a location by utilizing the optimized entity tracks.

According to yet another embodiment of the present invention, a non-transitory computer program product having a computer-readable storage medium including program code for optimizing multi-camera multi-entity artificial intelligence tracking systems wherein the program code when executed on a computer causes the computer to perform obtaining visual and location information of entities from the video feeds received from multiple cameras by employing an entity detection model and a re-identification model, predicting likelihood scores that entity detections from the visual information and the location information belong to an entity track by employing a multi-layer perceptron, processing, by a processor device, the entity detections predicted into entity tracks by employing combinatorial optimization of the likelihood scores by identifying assumptions from the likelihood scores, the entity detections, and the entity tracks, filtering conflicting assumptions that could not be satisfied by any possible solution to obtain a filtered assumptions set, optimizing an answer set by utilizing the filtered assumptions set and the likelihood scores to maximize an overall score and obtain optimized entity tracks, and monitoring multiple entities within a location by utilizing the optimized entity tracks.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for optimizing multi-camera multi-entity artificial intelligence tracking systems.

The present embodiments can analyze, by a detection module, video feeds from multiple cameras to obtain entity detections in each frame. In an embodiment, a scoring module can take visual and location information from entity detections and can output a score indicating how likely it is that both entity detections belong to the same entity or not. The higher the score the more likely the entity detections contain the same entity. The scores can be employed by an association module that utilizes combinatorial optimization to associate entity detections with entity tracks such that the entity tracks can be logically consistent and overall score can be maximized. The overall score can be the sum of all the scores between entity detections that are associated with the same entity track. In an embodiment, the fast association module can be implemented as answer set programming optimization. The fast association module can output the set of optimized entity tracks. Thus, the present embodiments can provide error-free multiple entity tracking by reducing the effect of missed or false detections from an entity detection model and re-identification model by optimizing multi-camera multi-entity artificial intelligence tracking systems.

In an embodiment, healthcare providers and patients can be tracked within a hospital ward by utilizing the optimized entity tracks. In another embodiment, people in crowded places, such as airports, schools, sports arenas, etc., can be tracked by utilizing the optimized entity tracks.

Systems for tracking multiple entities, such as people or objects, across multiple cameras can utilize a combinatorial optimization module, such as answer set programming optimization, to obtain logically consistent assignment of detections to tracks. However, employing a combinatorial optimization module can be computationally expensive and time consuming.

The present embodiments can reduce the computation load for solving answer set programming optimization in multi-camera multi-entity tracking artificial intelligence systems. In an embodiment, an assumptions set can be identified that can constrain the optimization problem and significantly speed up finding a high-quality solution by further identifying and eliminating conflicts in a assumptions set. By reducing the computation load for solving answer set programming, the present embodiments can improve the efficiency of multi-camera multi-entity tracking systems that can employ artificial intelligence models. Thus, the present embodiments can overcome the computation resource and time constraints that can result from employing combinatorial optimization with multi-entity tracking systems.

Figure 1:
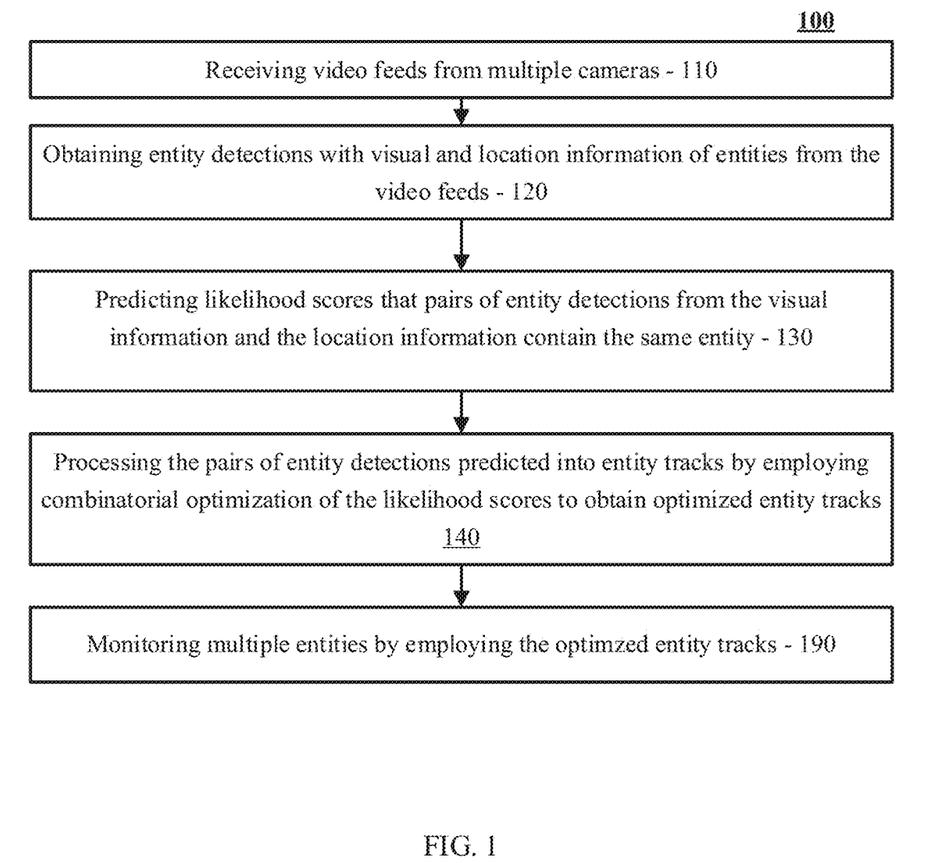
FIG. 1 is a flow diagram illustrating a high-level method for optimizing multi-camera multi-entity tracking artificial intelligence systems, in accordance with an embodiment of the present invention.

Referring now in detail to the figures in which like numerals represent the same or similar elements and initially to FIG. 1, a high-level method for optimizing multi-camera multi-entity artificial intelligence tracking systems 100 is shown in accordance with one embodiment of the present invention.

Figure 6:
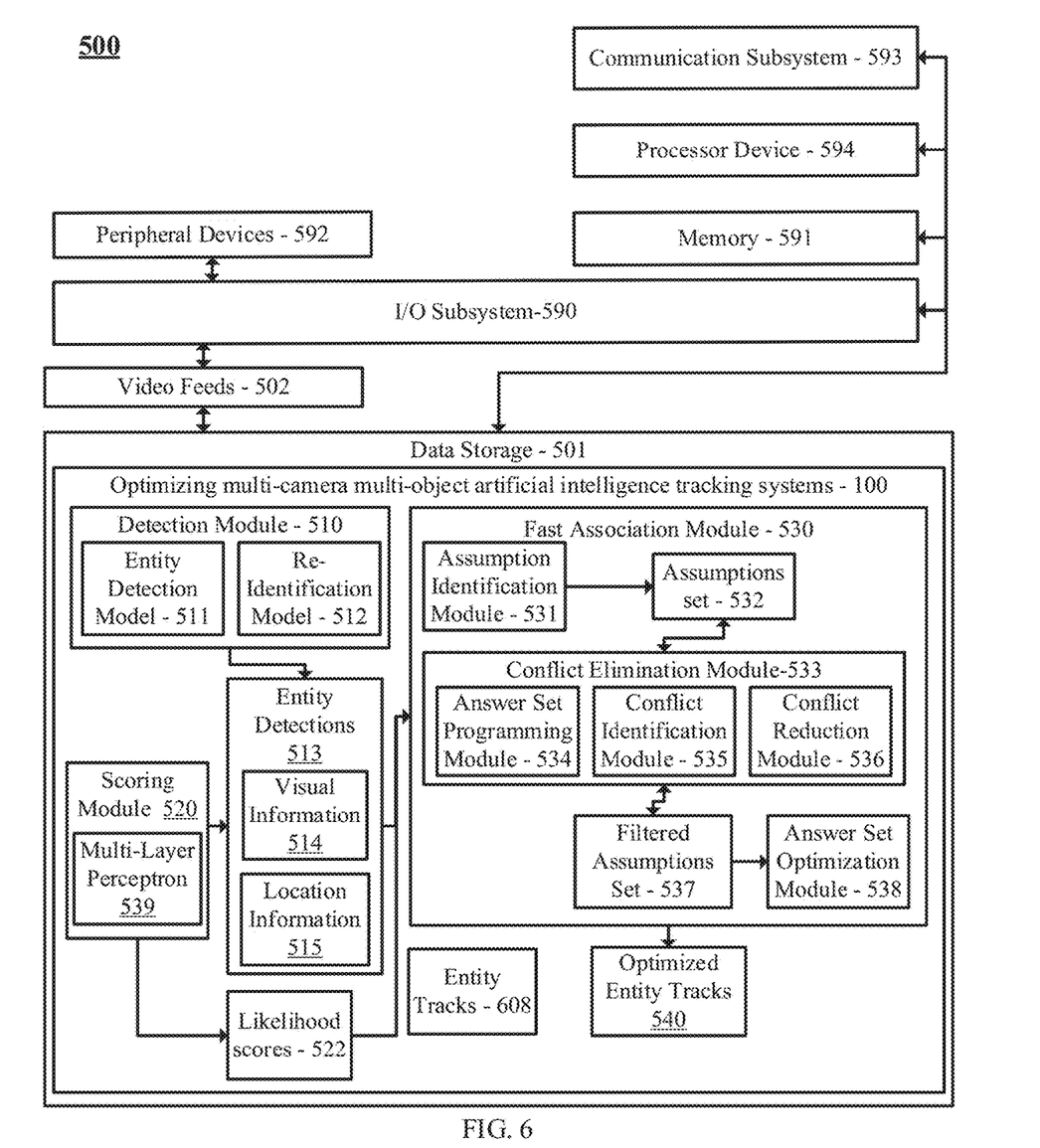
FIG. 6 is a block diagram illustrating a system for optimizing multi-camera multi-entity artificial intelligence tracking systems, in accordance with an embodiment of the present invention.

In an embodiment, multiple entities 611, 612 (shown in FIG. 7) can be detected from video feeds 502 (shown in FIG. 6). The visual information 514 (shown in FIG. 6) and location information 515 (shown in FIG. 6) of entity detections 513 (shown in FIG. 6) can be obtained to compute likelihood scores 522 (shown in FIG. 6) that entity detections 513 belong to an entity track 608 (shown in FIG. 6). The entity detections 513 predicted into entity tracks 608 can be processed by a processor device 594 (shown in FIG. 6) by employing combinatorial optimization of the likelihood scores 522 to obtain optimized entity tracks 540 (shown in FIG. 6). The optimized entity tracks 540 can be utilized to monitor multiple entities 611, 612 (shown in FIG. 7) within a location. An action plan 613 (shown in FIG. 7) can be created after monitoring the multiple entities 611, 612. A decision-making entity 615 (shown in FIG. 7) can implement the action plan 613.

In block 110, video feeds 502 can be received from multiple cameras 601, 602 (shown in FIG. 6). In an embodiment, the video feeds 502 can be received from multiple cameras 601, 602. In another embodiment, the video feeds 502 can be received from memory 591 (shown in FIG. 6). In yet another embodiment, the video feeds 502 can be received through a network.

In block 120, entity detections 513 with visual information 514 and location information 515 of entities 611, 612 can be obtained by a trained entity detection model 511 and a trained re-identification model 512 from the video feeds 502.

In block 130, likelihood scores 522 that entity detections 513 from the visual information 514 and the location information 515 belong to an entity track 608 are predicted by a scoring module 520.

In block 140, entity detections 513 predicted into entity tracks 608 can be processed, by a processor device 594, by employing combinatorial optimization of the likelihood scores 522 to obtain optimized entity tracks 540.

In block 190, multiple entities 611, 612 can be monitored by employing the optimized entity tracks 540. In an embodiment, multiple entities 611, 612 can be monitored through a visualized representation shown in a monitor. In an embodiment, an action plan 613 can be created by utilizing the optimized entity tracks 540. In an embodiment, the action plan 613 can be implemented by a decision making entity 615.

Figure 2:
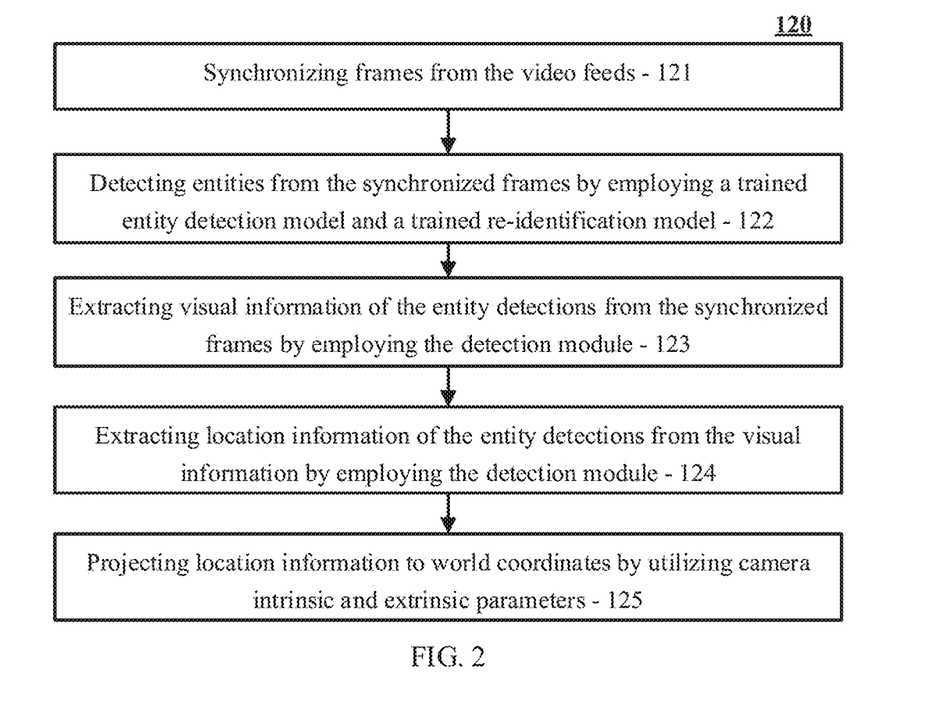
FIG. 2 is a flow diagram illustrating a method for obtaining, by a detection module, entity detections with visual and location information of entities from the video feeds in accordance with an embodiment of the present invention.

Referring now to FIG. 2, a method for obtaining, by a detection module, detections with visual and location information of entities from the video feeds 120 is shown in accordance with an embodiment of the present invention.

In an embodiment, visual information 514 and location information 515 can be extracted for multiple entities 611, 612 from synchronized frames of multiple cameras 601, 602 by employing a trained entity detection model 511 and a trained re-identification model 512.

In block 121, frames from the video feeds 602, 604 can be synchronized. In an embodiment, frames from the video feeds 602, 604 can be synchronized by extracting frames from a video feed containing a common entity and finding a corresponding frame from other video feeds containing the common entity based on the closest timestamp or frame number.

In block 122, multiple entities 611, 612 can be detected from the synchronized frames by employing a trained entity detection model 511.

In block 123, visual information 514 can be extracted from the synchronized frames. In an embodiment, visual information 514 can be extracted by employing a trained entity detection model 511 (shown in FIG. 6) and a trained re-identification (reID) model 512 (shown in FIG. 6) to detect and localize entities in the synchronized frames. In an embodiment, visual information 514 can include a bounding box, entity classification label, and a likelihood of entity classification. In an embodiment, entities can be objects or people. For example, objects can include tables, chairs, cars, balls, etc.

In an embodiment, the trained entity detection model 511 can be a Faster region-based convolutional neural network (R-CNN), single shot detector (SSD), scalable and efficient object detection (EfficientDet), or Mask R-CNN. In an embodiment, The trained reID model can be a contrastive language-image pretraining (CLIP)-reID model. In an embodiment, the trained entity detection model 511 can be trained with the common objects in context (COCO) dataset and people tracking dataset. In an embodiment, the trained reID model 512 can be trained with the Airport dataset and COCO. Other training datasets are contemplated. Other models for the trained entity detection model 511 and the trained reID model 512 are contemplated.

In an embodiment, bounding boxes are rectangular regions employed in the computer vision field to identify an object in an image. Bounding boxes can be defined by the following parameters: entity classification label, top-left corner (x,y) coordinates of the box, bottom-right corner (x,y) coordinates of the box, center (x,y) coordinates of the center of the box, width of the box, height of the box, and confidence score of the likelihood that the box contains the entity.

In block 124, the location information 515 can be extracted using the bounding box coordinates of the visual information 514 in the frame. In an embodiment, the location information 515 can be the coordinates of the entity detections 513 within the video frame as represented by the bounding box coordinates.

In block 125, location information 515 can be projected to world coordinates using the camera intrinsic (e.g., focal length, principal point) and extrinsic parameters (e.g., location and orientation of the camera itself). In an embodiment, a projection model such as a pinhole camera model can be employed. In another embodiment, a computing device configured to run triangulation can be employed.

Figure 3:
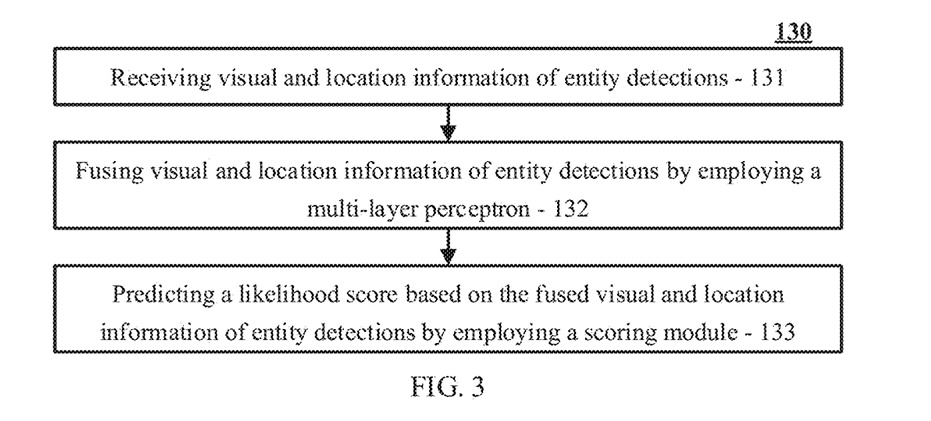
FIG. 3 is a flow diagram illustrating a method for predicting, by a scoring module, likelihood scores that entity detections from the visual information and the location information belong to an entity track, in accordance with an embodiment of the present invention.

Referring now to FIG. 3, a method for predicting, by a scoring module, likelihood scores that entity detections from the visual information and the location information belong to an entity track 130, is shown in accordance with an embodiment of the present invention.

In an embodiment, the visual information 514 and location information 515 can be fused using deep learning with a simple multi-layer perceptron (MLP) 539 (shown in FIG. 6). In an embodiment, visual information 514 and location information 515 can be concatenated and passed through the MLP 539 to output transformed and weighted features. In an embodiment, the output features can be used to compute cosine similarity to produce a matching/likelihood score between the person detections. Cosine similarity between visual features of different person detections can be used to compute the visual score and the normalized absolute difference between the location values in the world coordinate space used as a location score. Both scores can be combined with a simple mathematical sum after normalizing them to the same range between 0 and 1. In an embodiment, the entity detections 513 that can contain the same entity have higher likelihood score 522 than the entity detections 513 that can contain different entities across frames and cameras.

In block 131, visual information 514 and location information 515 of entity detections 513 can be received for processing.

In block 132, the visual information 514 and location information 515 can be fused by employing the MLP 539.

In block 133, likelihood scores 522 can represent the likelihood that entity detections 513 contain the same entity can be predicted by the scoring module 520 (shown in FIG. 6).

In block 134, the scoring module 520 can group entity detections 513 into entity tracks 608 based on the likelihood scores 522 of the entity detections 513. The higher the score, the higher the likelihood that the entity detections contain the same entity.

Figure 4:
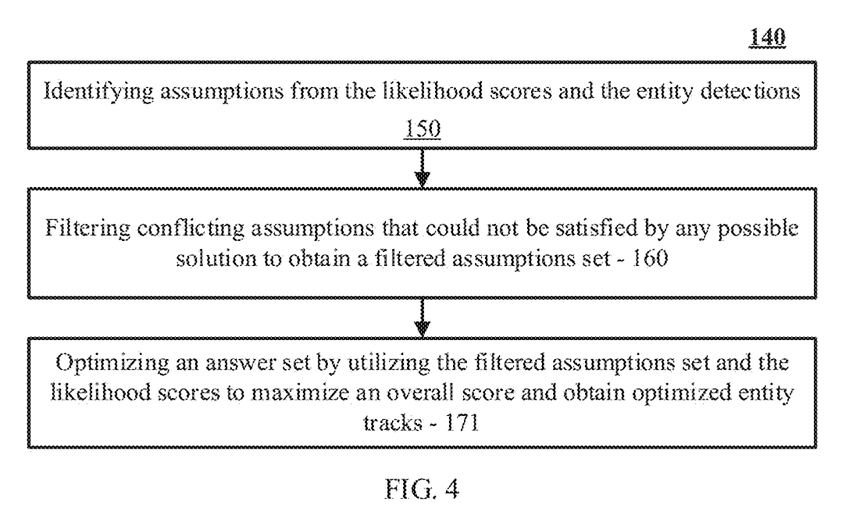
FIG. 4 is a flow diagram illustrating a method for processing the entity detections by employing combinatorial optimization of the likelihood scores to obtain optimized entity tracks, in accordance with an embodiment of the present invention.

Referring now to FIG. 4, a method for processing, by a fast association module, the entity detections by employing combinatorial optimization of the likelihood scores to obtain optimized entity tracks 140, is shown in accordance with an embodiment of the present invention.

In an embodiment, an assumptions set 532 (shown in FIG. 6) can be identified by the assumption identification module 531 (shown in FIG. 6). In an embodiment, the conflict elimination module 533 (shown in FIG. 6) can take the assumptions set 532 (shown in FIG. 6) and eliminate conflicting assumptions to obtain a filtered assumptions set 537 (shown in FIG. 6). In an embodiment, the resulting filtered assumptions set 537 can be employed to constrain the answer set optimization. In an embodiment, the answer set optimization module 538 (shown in FIG. 6) can take the scores from the scoring module 520 and can output optimized entity tracks 540 that maximize the overall score.

In block 150, identifying, by an assumption identification module 531, assumptions from the likelihood scores 522 and the entity detections 513. In an embodiment, these assumptions can act as constraints on the solution space of the answer set programing optimization, essentially eliminating many possible solutions from consideration. For example, assumptions may be that entity detections that received a high score from the scoring module 520 belong to the same entity track 608 and that a pair of entity detections 513 that received a low score from the scoring module 520 belong to different entity tracks 608. The assumptions set 532 may induce contradictory constraints that could not be satisfied by any possible solution.

In an embodiment, the assumptions set 532 can be a set of constraints applied to individual detection pairs with their likelihood scores 522. For example, if two entity detections 513 from the same camera are considered, a simple constraint that states that they cannot belong to the same track ID can be applied, meaning that the entity detections 513 will be assigned to different entity tracks 608. Another example of a constraint could be that if a pair of entity detections 513 have an intersection over union (IoU) score less than a predefined threshold in the constraint, they cannot be associated into a single entity track 608. In an embodiment, the structure of the assumptions set 532 can be conditional checks with predefined thresholds of the input entity detection 513 pairs and their likelihood scores 522. In an embodiment, the assumptions set 532 can be generated by the programmer based on a combination of factors including assignments of detections to a detection track, occlusion of the detections, visibility of the detection tracks, false detections, etc.

In an embodiment, contradictory constraints can be constraints of an assumption that are impossible to form a solution. For example, an assumption having constraint C1 stating "A and B must be on the same track;" C2 stating "B and C must be on the same track;" and C3 stating "A and C must be on different tracks." In this example, C1, C2, C3 are contradictory constraints. In an embodiment, conflicting assumptions can be assumptions containing contradictory constraints that are flagged to be eliminated.

In block 160, conflicting assumptions that could not be satisfied by any possible solution can be filtered by employing a conflict elimination module 533 to obtain a filtered assumptions set 537.

In block 171, an answer set 532 can be optimized by employing an answer set optimization module that utilizes filtered assumptions set 537 and the likelihood scores 522 to maximize an overall score and obtain optimized entity tracks 540. In an embodiment, to maximize the overall score, an answer set program with logical constraints can be employed to find the maximum overall score and verify that a solution exists such that combinations of entity detections 513 with their likelihood scores 522 are maximized while adhering to the constraints of the assumptions.

Figure 5:
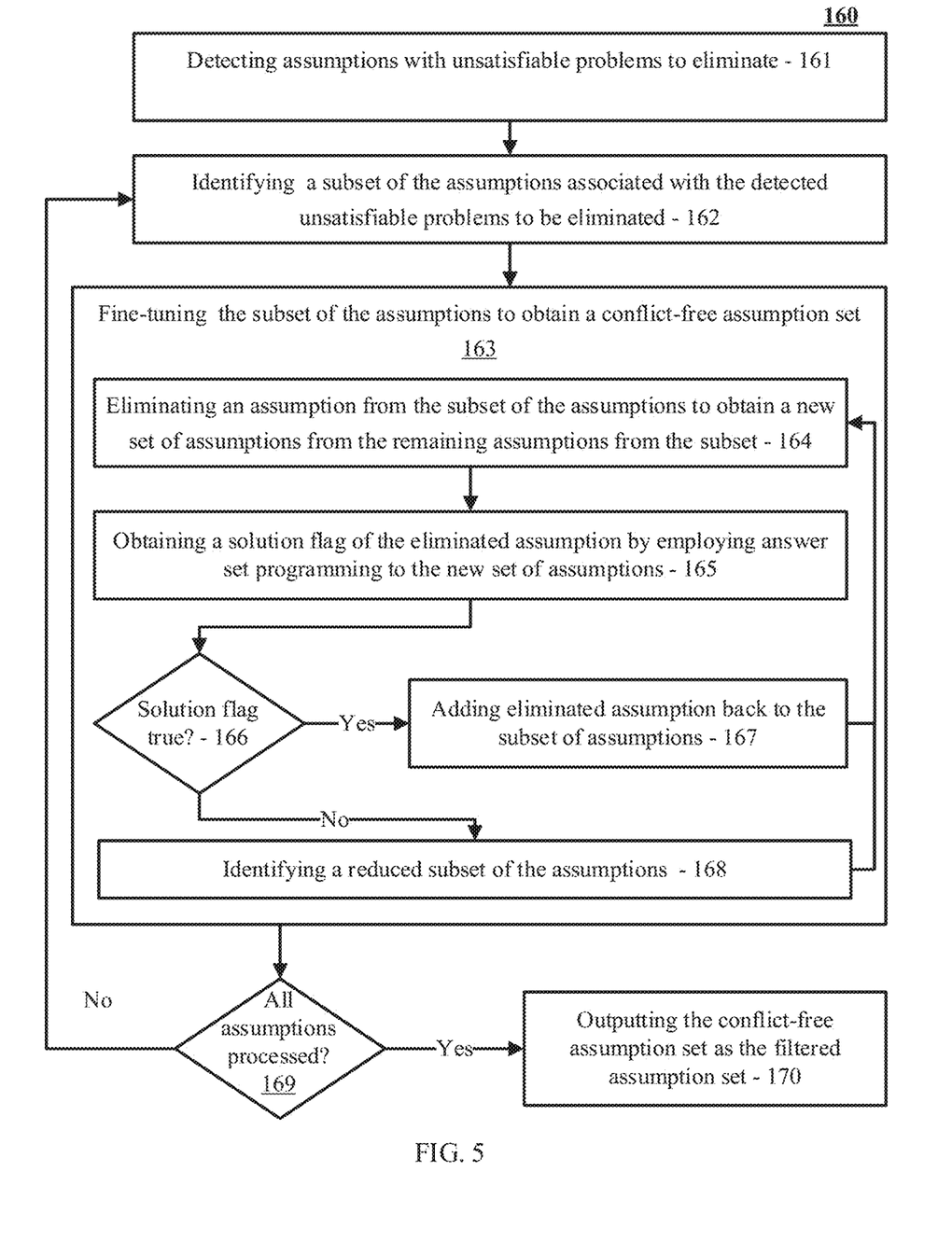
FIG. 5 is a flow diagram showing a method for filtering, by a conflict elimination module, conflicting assumptions with unsatisfiable problems to obtain a filtered assumptions set, in accordance with an embodiment of the present invention.

Referring now to FIG. 5, a method for filtering, by a conflict elimination module, conflicting assumptions with unsatisfiable problems to obtain a filtered assumptions set 160, is shown in accordance with an embodiment of the present invention.

In an embodiment, the conflict elimination module 533 (shown in FIG. 6) can include three submodules: an answer set programming module 534 (shown in FIG. 6), a conflict identification module 535 (shown in FIG. 6), and a conflict reduction module 536 (shown in FIG. 6). In an embodiment, the answer set programming module 534 can be employed to detect if a solution consistent with the assumptions exists, or if the problem is unsatisfiable. In an embodiment, the conflict identification module 535 can identify a subset of the assumptions that are involved in the conflict with unsatisfiable problems. In an embodiment, the conflict reduction module 536 can be used to reduce this set and minimize an identified subset of conflicting assumptions.

In block 161, answer set programing can be employed to detect if a solution consistent with the assumptions exists, or if the problem is unsatisfiable (e.g., no solution exists) by utilizing an answer set programming module 534. Answer set programming uses logic programming to search optimal solutions of an assumptions set 532. In an embodiment, a publicly available package for answer set programming (e.g., clingo) can be employed to perform the optimization search.

In block 162, the conflict identification module 535 can identify a subset of the assumptions that are involved in the conflict with unsatisfiable problems. In an embodiment, the conflicting subset can be identified by creating a conflict graph and using the first unique implication point (UIP) algorithm which can be a part of the conflict identification module 535.

In an embodiment, the conflict identification module 535 can apply programmer-generated constraints to detect conflicts in the generated assumptions. In another embodiment, the conflict identification module 535 can save corrections to the assumptions in a corrected assumptions file. The subset of conflicting assumptions can be identified by the conflict identification module 535 may be unnecessarily large. Some of the assumptions in this subset might not participate in the conflict.

In block 163, the conflict reduction module 536 can be used to reduce this set and minimize an identified subset of conflicting assumptions. In an embodiment, the current set of conflicting assumptions can be processed to eliminate one assumption from this set. The remaining assumptions from the set can be utilized as a new assumptions set 532 for answer set programming. If a solution can be found under this new assumptions set 532, then the eliminated assumption was indeed part of the conflict, a solution flag can be set to true, and the eliminated assumption can be added back to the conflicting set and another assumption can be eliminated. If the problem is still unsatisfiable, the solution flag can be set to false and a new conflicting set can be identified that is smaller than the previous one. The conflict reduction system can then be applied to this new conflicting set. This filtering method continues until all assumptions in the set have been determined to be part of the conflict, or the remaining conflicting set is smaller than a desired size. In an embodiment. the desired size can be a predefined number. For example, the desired size can be 0, 5, or 10.

In an embodiment, once a reduced conflicting set is identified, it can be eliminated from the original assumptions set 532 and the answer set programing can be reran with the new assumptions set 532. If a solution still does not exist, the conflict identification module 535 and conflict reduction module 536 are applied again. Once all conflicts have been eliminated a filtered assumptions set 537 can be returned to be optimized by the answer set optimization module 538.

Referring now to FIG. 6, a block diagram illustrating a system for optimizing multi-camera multi-entity artificial intelligence tracking systems 500, in accordance with an embodiment of the present invention.

The computing device 500 illustratively includes the processor device 594, an input/output (I/O) subsystem 590, a memory 591, a data storage device 501, and a communication subsystem 593, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 591, or portions thereof, may be incorporated in the processor device 594 in some embodiments.

The processor device 594 may be embodied as any type of processor capable of performing the functions described herein. The processor device 594 may be embodied as a single processor, multiple processors, a Central Processing Unit(s) (CPU(s)), a Graphics Processing Unit(s) (GPU(s)), a single or multi-core processor(s), a digital signal processor (s), a microcontroller(s), or other processor(s) or processing/controlling circuit(s).

The memory 591 may be embodied as any type of volatile or non-volatile memory or data storage capable of performing the functions described herein. In operation, the memory 591 may store various data and software employed during operation of the computing device 500, such as operating systems, applications, programs, libraries, and drivers. The memory 591 is communicatively coupled to the processor device 594 via the I/O subsystem 590, which may be embodied as circuitry and/or components to facilitate input/output operations with the processor device 594, the memory 591, and other components of the computing device 500. For example, the I/O subsystem 590 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 590 may form a portion of a system-on-a-chip (SOC) and be incorporated, along with the processor device 594, the memory 591, and other components of the computing device 500, on a single integrated circuit chip.

The data storage device 501 may be embodied as any type of device or devices configured for short-term or long-term storage of data such as, for example, memory devices and circuits, memory cards, hard disk drives, solid state drives, or other data storage devices. The data storage device 501 can store program code for optimizing multi-camera multi-entity artificial intelligence tracking systems 100, including detection module 510, scoring module 520, and fast association module 530. Any or all of these program code blocks may be included in a given computing system.

The communication subsystem 593 of the computing device 500 may be embodied as any network interface controller or other communication circuit, device, or collection thereof, capable of enabling communications between the computing device 500 and other remote devices over a network. The communication subsystem 593 may be configured to employ any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 592. The peripheral devices 592 may include any number of additional input/output devices, interface devices, and/or other peripheral devices. For example, in some embodiments, the peripheral devices 592 may include a display, touch screen, graphics circuitry, keyboard, mouse, speaker system, microphone, network interface, and/or other input/output devices, interface devices, GPS, camera, and/or other peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be employed. Moreover, additional processors, controllers, memories, and so forth, in various configurations can also be utilized. These and other variations of the processing system 500 are readily contemplated by one of ordinary skill in the art given the teachings of the present invention provided herein.

Figure 7:
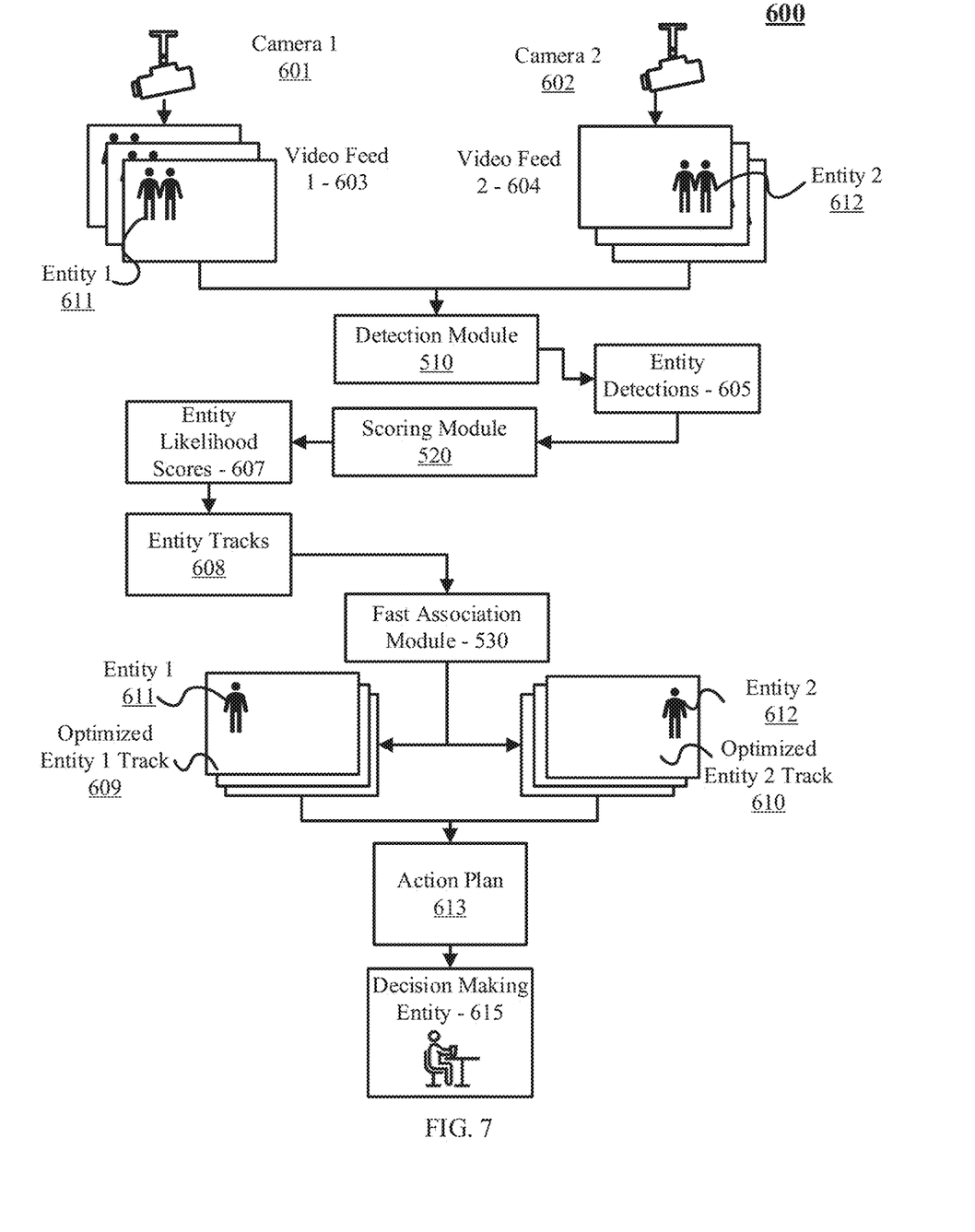
FIG. 7 is a block diagram illustrating a system for optimizing multi-camera multi-entity artificial intelligence tracking systems 600, in accordance with an embodiment of the present invention.

Referring now to FIG. 7, a block diagram illustrating a system for optimizing multi-camera multi-entity artificial intelligence tracking systems 600, in accordance with an embodiment of the present invention.

Practical applications of the present embodiments can include robust tracking of single person of interest in heavily occluded and complex environments with multi camera access such as museums, shopping malls, airports, hospitals, etc. In an embodiment, entities can be tracked in heavily crowded scenarios such as sports fields with multiple drone view cameras. In another embodiment, a path taken by an entity can be backtraced in large campuses such as government buildings and universities for offline analytics and other non-real time investigations. In yet another embodiment, patients can be monitored to ensure that they are within hospital grounds, or more specifically, within their respective wards. By monitoring patients within a hospital, a decision making entity 615 can implement an action plan 613.

In an embodiment, multiple cameras 601 and 602 can obtain video feeds 603 and 604 containing entity 1 611 and entity 2 612 respectively. Video feeds 603, 604 can be processed by the detection module 510 to detect entity 1 detections 605 and entity 2 detections 606. Entity 1 detections 605 and entity 2 detections 606 can be processed by the scoring module 520 to predict likelihood scores 522. The entity detections 605, 606 and likelihood scores 522 will be processed by the fast association module to obtain optimized entity tracks 609, 610. The optimized entity tracks 609, 610 can contain frame by frame visual and location information 515 of entities 611 and 612, respectively, from the video feeds which can then be processed later for monitoring entities within a location.

In an embodiment, action plan 613 for entity 1 611 can be created based on the optimized entity 1 track 609. For example, action plan 613 can be assigning a specific healthcare provider to entity 1 611. In this example, entity 1 611 can be a patient and the specific healthcare provider can be assigned to take care of entity 1 611 based on the healthcare provider's relationship to entity 1 611. In an embodiment, a decision making entity 615 can implement action plan 613 by assigning the specific healthcare provider to entity 1 611 by adjusting the schedule of the specific healthcare provider.

In another embodiment, action plan 613 for entity 2 612, as a healthcare provider, can be tracked within a hospital ward. By tracking entity 2 612 within a hospital ward, a decision entity 615 can determine which patient is being attended by entity 2 612 and a log can be created.

In another embodiment, action plan 613 for entity 2 612 can be created based on the optimized entity 2 track 610. For example, action plan 613 can be tracking entity 2 612 within a hospital ward. In this example, action plan 613 can show frame by frame tracking of entity 2 612 as a patient within a specific timeframe. The decision making entity 615 can determine security plans (e.g., locking doors, having personnel) to ensure safety and health of entity 2 612 as the patient.

Figure 8:
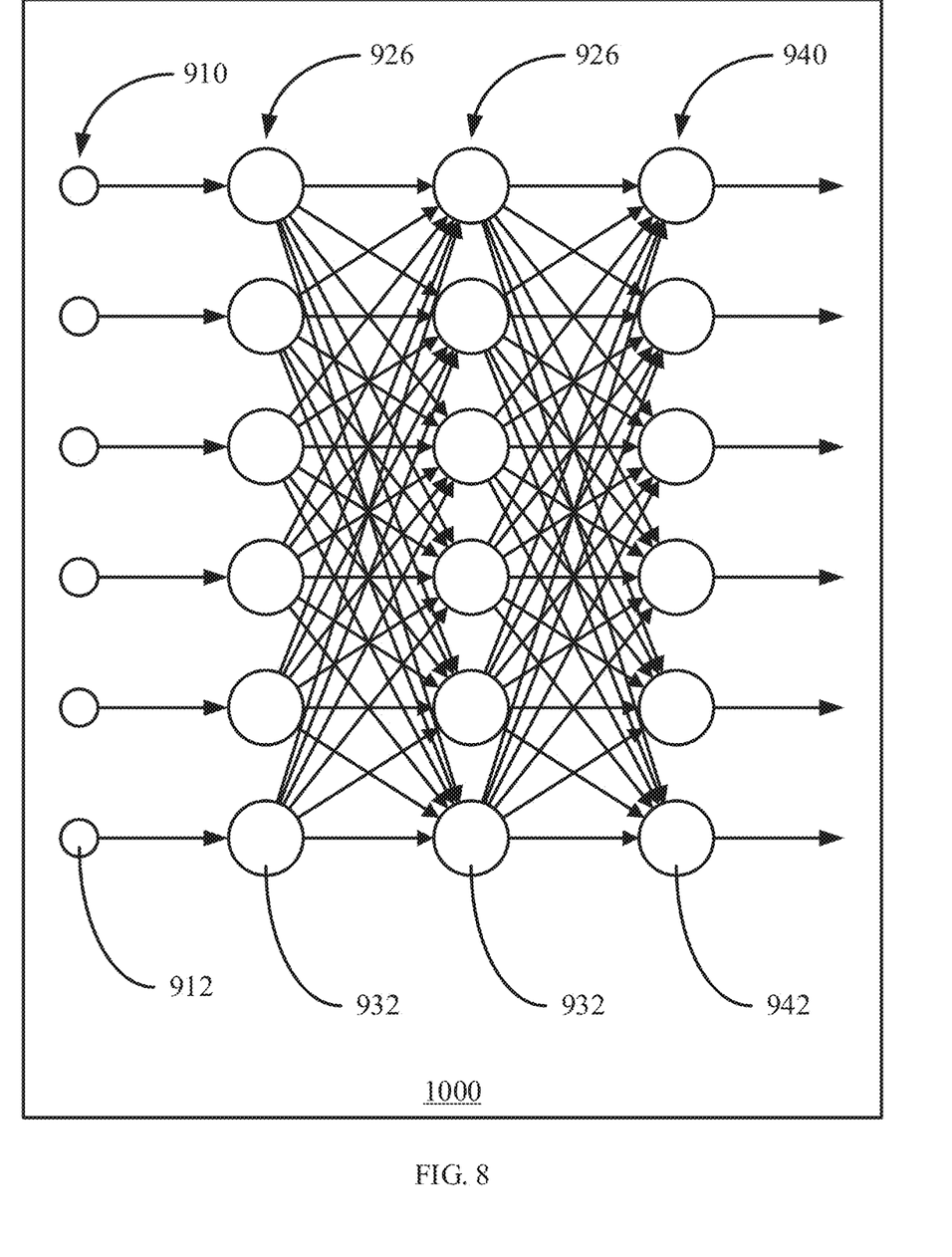
FIG. 8 is a block diagram illustrating a deep neural network system, in accordance with an embodiment of the present invention.

Referring now to FIG. 8, a block diagram illustrating a deep neural network system, in accordance with an embodiment of the present invention.

In an embodiment, neural networks can be utilized in tracking multiple entities with multiple cameras. For example, the entity detection model 511, re-identification model 512, and scoring module 520 that can employ MLP 539 can be neural networks.

A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In FIG. 8, a deep neural network is shown. The deep neural network 1000, such as a multilayer perceptron, can have an input layer 911 of source nodes 912, one or more computation layer(s) 926 having one or more computation nodes 932, and an output layer 940, where there is a single output node 942 for each possible category into which the input example could be classified. An input layer 911 can have a number of source nodes 912 equal to the number of data values 912 in the input data 911. The computation nodes 932 in the computation layer(s) 926 can also be referred to as hidden layers, because they are between the source nodes 912 and output node(s) 942 and are not directly observed. Each node 932, 942 in a computation layer generates a linear combination of weighted values from the values output from the nodes in a previous layer and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer or may have other configurations of connections between layers. If links between nodes are missing, the network is referred to as partially connected.

In an embodiment, the computation layers 926 can learn various features (e.g., visual information) of an entity from the video feeds 502 based on a configuration specific for that entity type. The output layer can provide the overall response of the network in a form of likelihood score that the entity detection 613 contains the entity and bounding box of the entity detection. In another embodiment, the computation layers 926 can learn various features (e.g., visual information 514 and location information 515) of an entity detection 613 from one video feed 602 and another entity detection from another video feed 603. Another computation layer 926, can learn the similarities between the features of a detection entity from one video feed 602 and another detected from another video feed 603 and weigh them. The output layer can provide the overall response of the network in a form of a likelihood score 522 that the entity detection 613 from the video feeds 502 contain the same entity.

Training a deep neural network can involve two phases, a forward phase where the weights of each node are fixed and the input propagates through the network, and a backwards phase where an error value is propagated backwards through the network and weight values are updated.

The computation nodes 932 in the one or more computation (hidden) layer(s) 926 perform a nonlinear transformation on the input data 912 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.). In some embodiments, the hardware processor subsystem can include and execute one or more software elements. The one or more software elements can include an operating system and/or one or more applications and/or specific code to achieve a specified result. In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for optimizing multi-camera multi-entity artificial intelligence tracking systems comprising:
   obtaining visual information and location information of entities from video feeds received from multiple cameras by employing an entity detection model and a re-identification model;
   predicting likelihood scores that entity detections from the visual information and the location information belong to an entity track by employing a multi-layer perceptron;
   processing, by a processor device, the entity detections predicted into entity tracks by employing combinatorial optimization of the likelihood scores by:
      identifying assumptions from the likelihood scores, the entity detections, and the entity tracks;
      filtering the assumptions with unsatisfiable problems to obtain a filtered assumptions set;
      optimizing an answer set by utilizing the filtered assumptions set and the likelihood scores to maximize an overall score and obtain optimized entity tracks; and
   monitoring multiple entities within a location by utilizing the optimized entity tracks.

2. The computer-implemented method of claim 1, wherein monitoring multiple entities further comprises tracking multiple patients within a hospital ward.

3. The computer-implemented method of claim 1, wherein monitoring multiple entities further comprises tracking healthcare providers within a hospital ward.

4. The computer-implemented method of claim 1, wherein filtering conflicting assumptions further comprises detecting the assumptions with unsatisfiable problems to eliminate.

5. The computer-implemented method of claim 4, wherein detecting the assumptions further comprises identifying a subset of the assumptions associated with the detected unsatisfiable problems to eliminate.

6. The computer-implemented method of claim 1, wherein filtering conflicting assumptions further comprises fine-tuning a subset of the assumptions to obtain a conflict-free assumption set.

7. The computer-implemented method of claim 6, wherein fine-tuning further comprises eliminating an assumption from the subset of the assumptions to obtain a new assumptions set from remaining assumptions from the subset.

8. The computer-implemented method of claim 6, wherein fine-tuning further comprises obtaining a solution flag of an eliminated assumption by employing answer set programming to a new assumptions set.

9. The computer-implemented method of claim 6, wherein fine-tuning further comprises processing a reduced subset of the assumptions having another eliminated assumption based on a solution flag.

10. A system for optimizing multi-camera multi-entity artificial intelligence tracking systems comprising:
   a memory; and
   one or more processor devices in communication with the memory configured to:
      obtain visual information and location information of entities from video feeds received from multiple cameras;
      predict likelihood scores that entity detections from the visual information and the location information belong to an entity track;

process the entity detections predicted into entity tracks by employing combinatorial optimization of the likelihood scores to:
  identify assumptions from the likelihood scores, the entity detections, and the entity tracks;
  filter the assumptions with unsatisfiable problems to obtain a filtered assumptions set;
  optimize an answer set by utilizing the filtered assumptions set and the likelihood scores to maximize an overall score and obtain optimized entity tracks; and
monitor multiple entities within a location by utilizing the optimized entity tracks.

11. The system of claim 10, wherein monitoring multiple entities further comprises tracking multiple patients within a hospital ward.

12. The system of claim 11, wherein monitoring multiple entities further comprises tracking healthcare providers within a hospital ward.

13. The system of claim 10, wherein filtering conflicting assumptions further comprises detecting the assumptions with unsatisfiable problems to eliminate.

14. The system of claim 13, wherein detecting the assumptions further comprises identifying a subset of the assumptions associated with the detected unsatisfiable problems to eliminate.

15. The system of claim 10, wherein filtering conflicting assumptions further comprises fine-tuning a subset of the assumptions to obtain a conflict-free assumption set.

16. The system of claim 15, wherein fine-tuning further comprises eliminating an assumption from the subset of the assumptions to obtain a new assumptions set from remaining assumptions from the subset.

17. The system of claim 15, wherein fine-tuning further comprises obtaining a solution flag of an eliminated assumption by employing answer set programming to a new assumptions set.

18. The system of claim 15, wherein fine-tuning further comprises processing a reduced subset of the assumptions having another eliminated assumption based on a solution flag.

19. A non-transitory computer program product comprising a computer-readable storage medium including program code for optimizing multi-camera multi-entity artificial intelligence tracking systems wherein the program code when executed on a computer causes the computer to perform:
  obtaining visual information and location information of entities from video feeds received from multiple cameras by employing an entity detection model and a re-identification model;
  predicting likelihood scores that entity detections from the visual information and the location information belong to an entity track by employing a multi-layer perceptron;
  processing, by a hardware processor, the entity detections predicted into entity tracks by employing combinatorial optimization of the likelihood scores by:
    identifying assumptions from the likelihood scores, the entity detections, and the entity tracks;
    filtering the assumptions with unsatisfiable problems to obtain a filtered assumptions set by further:
      detecting the assumptions with unsatisfiable problems to eliminate;
      identifying a subset of the assumptions associated with the detected unsatisfiable problems;
      fine-tuning the subset of the assumptions to obtain a conflict-free assumption set;
    optimizing, by an answer set optimization module, an answer set by utilizing the filtered assumptions set and the likelihood scores to maximize an overall score and obtain optimized entity tracks; and
  monitoring multiple entities within a location by utilizing the optimized entity tracks.

20. The non-transitory computer program product of claim 19, wherein monitoring multiple entities further comprises tracking multiple patients within a hospital ward.

* * * * *